United States Patent
Shin

(10) Patent No.: US 7,290,705 B1
(45) Date of Patent: Nov. 6, 2007

(54) SYSTEM AND METHOD FOR PERSONALIZING AND DISPENSING VALUE-BEARING INSTRUMENTS

(76) Inventor: Jai Shin, 3434 Bladensburg Rd., Brentwood, MD (US) 20722

( * ) Notice: Subject to any disclaimer, the term of this patent is extended or adjusted under 35 U.S.C. 154(b) by 405 days.

(21) Appl. No.: 10/905,122

(22) Filed: Dec. 16, 2004

(51) Int. Cl.
*G06F 7/08* (2006.01)

(52) U.S. Cl. ...................... 235/381; 235/379

(58) Field of Classification Search ......... 235/379–381
See application file for complete search history.

(56) References Cited

U.S. PATENT DOCUMENTS

| | | | |
|---|---|---|---|
| 5,243,174 A | 9/1993 | Veeneman et al. | |
| 5,426,594 A | 6/1995 | Wright et al. | |
| 5,442,567 A | 8/1995 | Small | |
| 5,513,117 A | 4/1996 | Small | |
| 5,561,604 A | 10/1996 | Buckley et al. | |
| 5,615,123 A | 3/1997 | Davidson et al. | |
| 5,617,528 A | 4/1997 | Stechmann et al. | |
| 5,687,087 A | 11/1997 | Taggart | |
| 5,748,484 A | 5/1998 | Cannon et al. | |
| 5,870,718 A | 2/1999 | Spector | |
| 5,930,810 A | 7/1999 | Farros et al. | |
| 5,983,200 A | 11/1999 | Slotznick | |
| 6,014,748 A | 1/2000 | Tushie et al. | |
| 6,092,054 A | 7/2000 | Tackbary et al. | |
| 6,202,155 B1 | 3/2001 | Tushie et al. | |
| 6,360,139 B1 | 3/2002 | Jacobs | |
| 6,369,908 B1 | 4/2002 | Frey et al. | |
| 6,574,604 B1 | 6/2003 | van Rijn | |
| 2001/0051876 A1 | 12/2001 | Seigel et al. | |
| 2003/0004997 A1 | 1/2003 | Parker et al. | |
| 2003/0159566 A1 | 8/2003 | Sater et al. | |
| 2004/0039702 A1 | 2/2004 | Blair et al. | |
| 2004/0099730 A1* | 5/2004 | Tuchler et al. | ............... 235/380 |
| 2005/0038714 A1* | 2/2005 | Bonet et al. | ................... 705/26 |
| 2005/0116027 A1* | 6/2005 | Algiene et al. | .............. 235/380 |

* cited by examiner

*Primary Examiner*—Jamara A. Franklin
(74) *Attorney, Agent, or Firm*—Rosenberg, Klein & Lee

(57) ABSTRACT

To personalize a value-bearing instrument, such as a gift card (100), a user-operated station (200) is provided. The user provides funds to the gift card (100) via a fund receiving module (287). The user then selects a set of merchants for which the funds are to be used via a user-interface. The user then authors a graphic arrangement on a template (233) presented on a display (230) of the user interface. When the graphic arrangement is to the user's liking, it is printed on an indicia carrier (105) by an instrument printer (215). The completed gift card is dispensed to the user via an instrument dispenser (220).

20 Claims, 8 Drawing Sheets

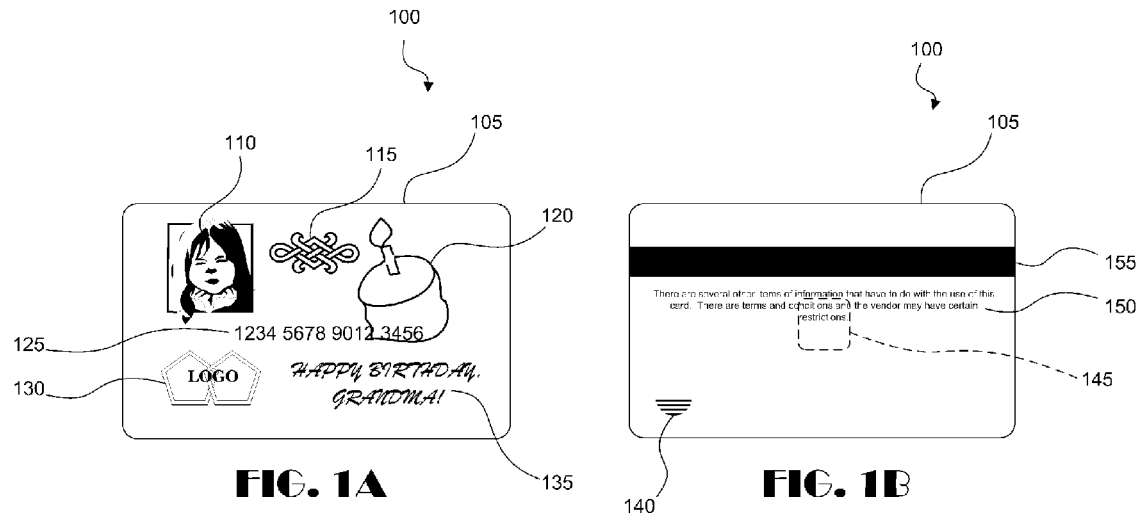
FIG. 1A
FIG. 1B
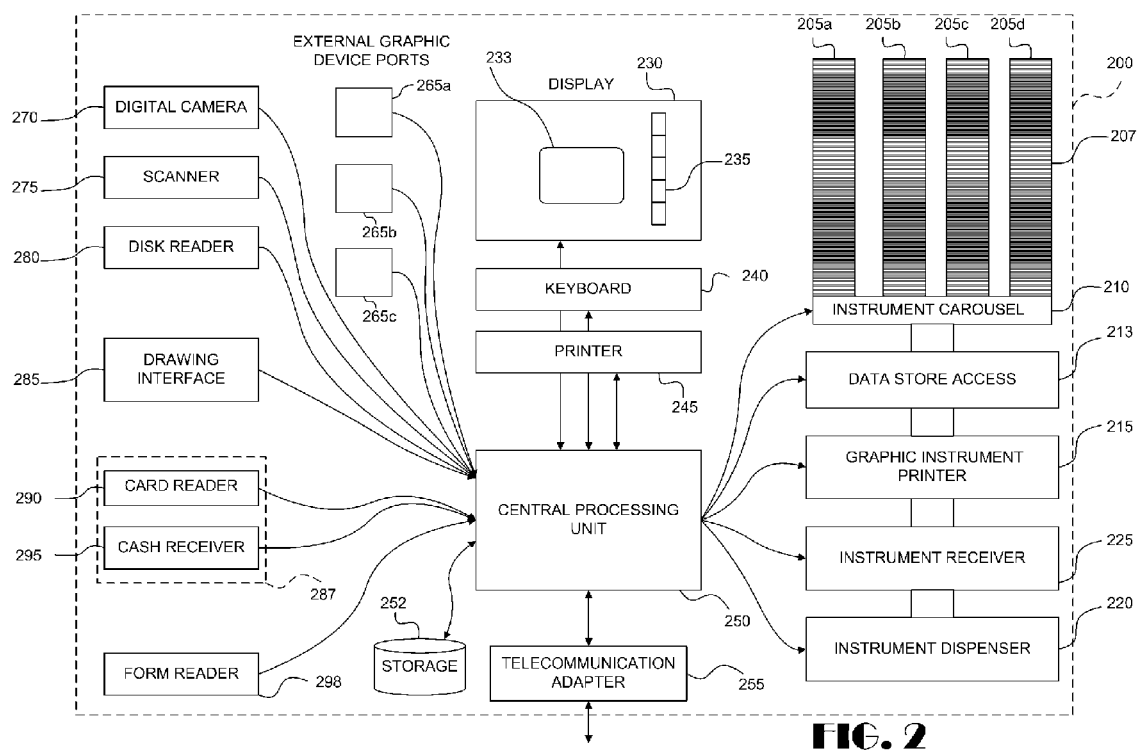
FIG. 2

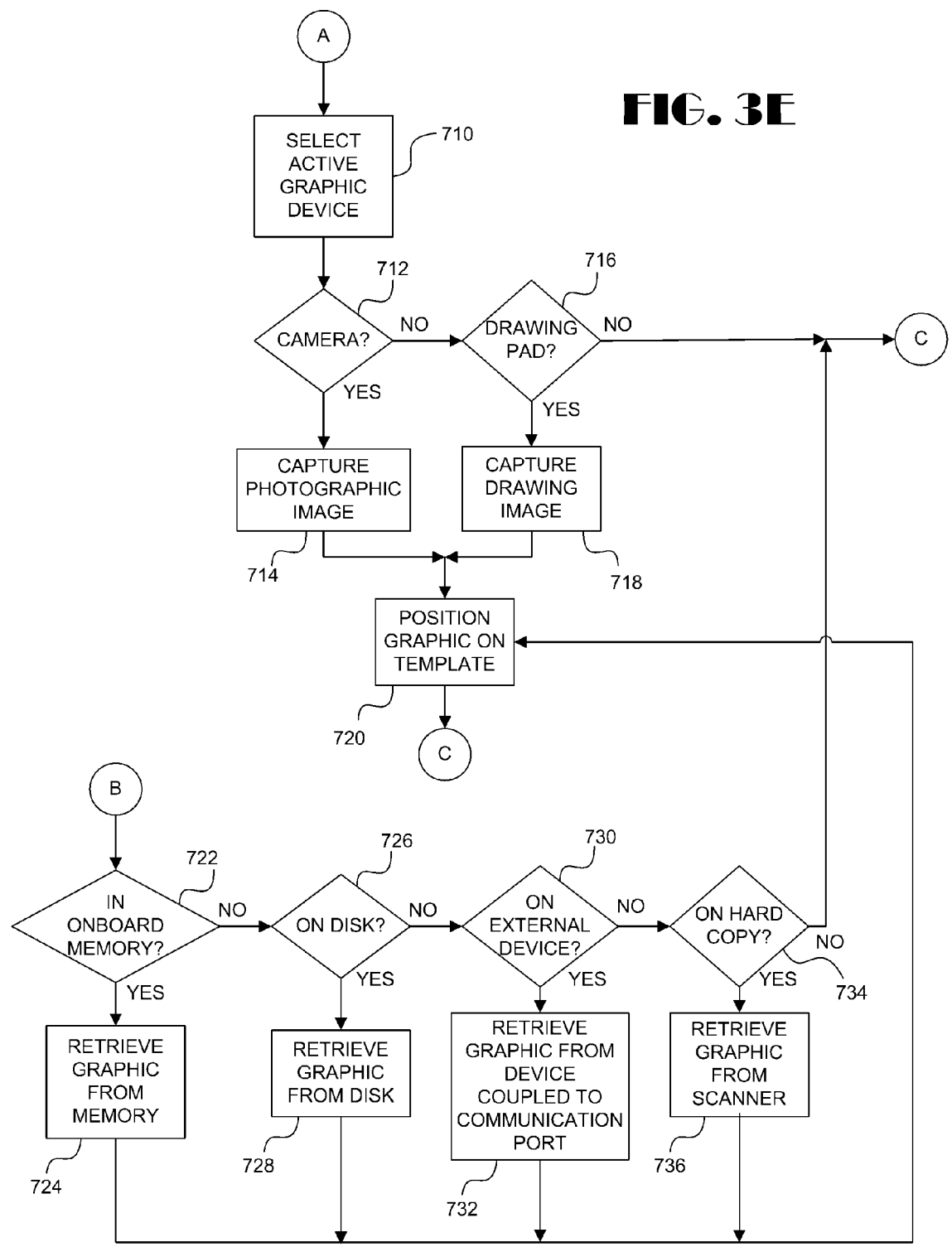

SYSTEM AND METHOD FOR PERSONALIZING AND DISPENSING VALUE-BEARING INSTRUMENTS

FIELD OF THE INVENTION

The invention described herein generally relates to the personalization of value-bearing instruments and to the dispensing of personalized value-bearing instruments.

Additionally, in further overall concept, the present invention is directed to an apparatus by which a user may purchase a value-bearing instrument, personalize the value-bearing instrument through a user interface and receive a personalized value-bearing instrument having an indication of an amount of funds being stored on a data store permanently coupled thereto.

Even further, the present invention relates to a method for manipulating graphical data through a user interface so as to personalize a value-bearing instrument having an indication of an amount of funds stored on a data store permanently attached thereto.

The present invention further relates to a method for dispensing a personalized value-bearing instrument at a user-operated station.

BACKGROUND OF THE INVENTION

A significant portion of the retail economy is driven by, and thus devoted to, the giving of gifts. This is especially true during certain seasons of the year, the most obvious example being the Christmas season. However, birthdays and other anniversaries provide impetus for the purchasing and giving of gifts throughout the entire year.

A common problem is often encountered when giving gifts, i.e., that of finding an appropriate item to give. Whereas generic gifts such as cash and gift certificates overcome the problem of matching a gift to its intended recipient, such an item does not in itself convey any sentiment and can thus leave the recipient with less than the expected level of excitement. However, to make the generic gift more personable, it is often accompanied by a greeting card, which allows the sender or the giver of the gift to convey an appropriate sentiment.

The greeting card industry enjoys a large share of the gift giving marketplace in that not only do greeting cards accompany gifts, but in many cases, the greeting card is the gift. That is to say, that the giver's gift is actually the sentiment conveyed by the card. The greeting card industry capitalizes on this fact by producing a wide array of cards having an even wider array of sentiments pre-printed thereon.

In choosing an appropriate card, the giver is confronted with the difficulty of selecting the card that simultaneously is appropriate to the occasion, the personality of the recipient and the sentiment the giver wishes to convey. Blank cards, i.e., greeting cards which are provided for personalization by the giver, overcome this shortcoming of pre-composed greeting cards to some degree, but require varying amounts of effort on the part of the giver to author the desired sentiment, and to do so in a neat and aesthetically pleasing way. Some artistic talent is often required when the giver wishes to add some graphic designs to the card.

Since the early days of personal computing, software has been made available for the purpose of authoring greeting cards and for printing the authored cards on a graphic-capable printer coupled to a personal computer. Most greeting card software includes a library of pre-composed graphics that a user may arrange into a desired graphic arrangement. This has allowed thousands, if not millions, of artistically-challenged gift givers to produce high quality, personalized greeting cards. However, the purchase of a greeting card software package may not be justifiable if the user only wishes to produce a small number of cards.

As an alternative to purchasing greeting card software, user-operated terminals, sometimes in the form of a kiosk, have been in use and have enjoyed some popularity. A user may format a given card at the kiosk, via software executed thereon, for a nominal fee. Such alternative is beneficial to those who wish to produce the occasional personalized greeting card. Even so, the capabilities provided by such known systems are typically limited to permitting users to select from pre-set optional designs, messages, and the like. They provide neither the breadth nor flexibility of capabilities to enable the user to actually formulate or compose original graphic designs and layouts of the card.

In the general case, when a greeting card accompanies a gift, the card is read and treated separately from the gift. As the recipient uses the gift apart from the card, the original sentiment conveyed by the greeting card is moved further back into memory until, eventually, the original sentiment that accompanied the gift becomes completely disassociated from it. Whereas the gift may still have some sentimental value, the original, desired sentiment of the giver remains filed away on the greeting card.

In light of the foregoing discussion of the prior art, the need is felt for a generic gift which can be creatively personalized with great flexibility at a user-operated station by a gift giver such that the original sentiment is conveyed each time the gift is used for its intended purpose.

SUMMARY OF THE INVENTION

The present invention provides a system and method for personalizing and dispensing a value-bearing instrument. When given as a gift, for example, the personalized value-bearing instrument may continually remind the recipient of the person giving the gift, the occasion on which the gift was received and, of a sentiment conveyed by the giver. Additionally, in accordance with certain aspects of the invention, the value-bearing instrument includes a data store for storing an indication of funds available to the bearer of the instrument. Thus, the value-bearing instrument may be continually refreshed in value, thereby conveying the original sentiment of the gift for extended periods of time. Moreover, both value and sentiment coincide in the gift and neither may be disassociated therefrom.

In one aspect of the invention, a method is provided for dispensing a personalized value-bearing instrument by first providing a user-operated station by which the instrument is to be vended. Funds are received from a user at the user-operated station and an indication of those funds is stored on a data store which is inseparably coupled to the value-bearing instrument. A user interface is provided at the user-operated station for personalizing an indicia carrier, which is also inseparably coupled to the value-bearing instrument. The user interface may then be used by the user to author a graphic arrangement thereon. When the user is satisfied with the graphic arrangement, the graphic arrangement is disposed on the indicia carrier of the value-bearing instrument and the instrument is dispensed to the user.

In another aspect of the invention, a method is provided for personalizing a value-bearing instrument at a user-operated station. The value-bearing instrument is provided with an indicia carrier and a data store, both of which are inseparably coupled to the value-bearing instrument. The user-operated station is provided with a user interface, a fund receiving module, a plurality of graphic retrieving modules, an indicia printer and a data access module for accessing and altering the data store. Funds are received at the receiving module from the user and an indication thereof is stored on the data store of the value-bearing instrument. The user is then presented with a graphical representation of the indicia carrier. The user then selects a graphic from the plurality of graphic retrieving modules and positions the graphic on a graphical representation of the indicia carrier at the user interface. When a desired graphic arrangement has been authored to completion, the graphic arrangement is printed or otherwise applied onto the indicia carrier and the value-bearing instrument is then dispensed to the user.

A further aspect of the invention provides a system for personalizing a value-bearing instrument at a user operated station. An indicia carrier and a data store are inseparably coupled to the value-bearing instrument. The user operated station includes a user interface operable to author a graphic arrangement on an indication of the indicia carrier presented to a user thereat, a fund receiving module operable to receive funds from the user, a plurality of graphic retrieving modules, each operable to retrieve a graphic from a graphic source and to subsequently add the graphic to a graphic arrangement, an indicia printer operable to print the graphic arrangement on the indicia carrier and a data access module for accessing and altering data on the data store.

BRIEF DESCRIPTION OF THE DRAWINGS

FIG. 1A and FIG. 1B are illustrations of the front and obverse, respectively, of a value-bearing instrument in the form of a gift card in accordance with the present invention;

FIG. 2 is a block diagram of an exemplary system in accordance with the present invention;

FIGS. 3D-3E is a flow chart illustrating the fundamental steps of authoring a personalized gift card in accordance with the present invention;

DETAILED DESCRIPTION OF THE PREFERRED EMBODIMENTS

Figure 3A:
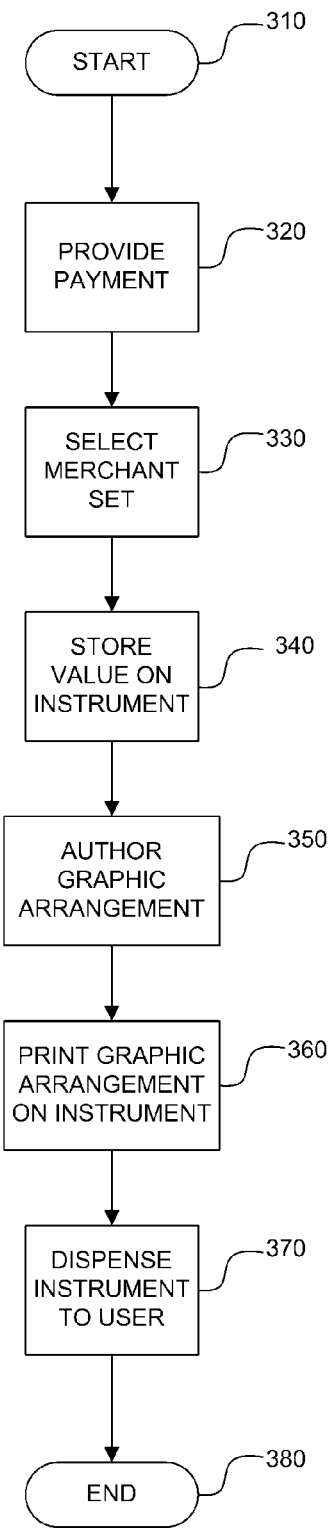
FIG. 3A is a flow chart illustrating fundamental method steps of the present invention.

Referring to FIGS. 1A-1B, there is shown an illustrative value-bearing instrument as produced in accordance with one exemplary embodiment of the present invention. In the Figures, the value-bearing instrument is in the form of a gift card 100 of a type known in the art as having a cash equivalent for purchasing goods and services from a predetermined merchant or set of merchants. Recognizable common features with the prior art will be apparent to skilled artisans as will the unique features provided thereto in accordance with the present invention. Additionally, it is to be noted that while a gift card format is shown for illustrative purposes, it is but one example of the numerous forms in which the value-bearing instrument of the present invention may be realized in practice.

FIG. 1A is an illustration of the front side of gift card 100. The gift card 100 includes an indicia carrier 105 having printed thereon a graphic arrangement produced by a user, as will be described further below. The graphic arrangement on the indicia carrier 105 includes a plurality of graphic elements generated from a plurality of graphic tools, as will be described in paragraphs that follow. Whereas, various types of graphical elements forming the graphical arrangement of FIG. 1A will be discussed presently, it is to be understood that the present invention limits neither the number nor the type of graphic elements in the arrangement.

As shown in FIG. 1A, indicia carrier 105 has disposed thereon a graphic image 110. Image 110 may be acquired via a digital camera, as will be discussed below, or may be a scanned image of a hard copy photograph. As will be discussed in paragraphs that follow, certain aspects of the invention provide for acquiring an image from a digital camera installed at the user station, from an external digital camera temporarily coupled to the user station by the user, or from a digital photograph stored on an external memory device such as a memory stick, such as is known in the art. Additionally, the digital image 110 may be acquired by scanning a photograph on a digital scanner installed at the user station, as will be described further below.

Indicia carrier 105 may have further disposed thereon design elements such as clip art 115. Various graphical art elements such as clip art 115 may be acquired from an on board library stored at the user station. Alternatively, the graphic elements such as clip art 115 may be brought to the user station on an external memory device such as a CD ROM and retrieved therefrom via a disk reader installed thereon.

As will be discussed further below, certain embodiments of the present invention include a drawing interface for allowing a user to author his own graphical element, such as that shown at 120. The drawing interface installed at the user station provides a set of drawing tools for creating a drawing in the form of a digital graphic, such as the birthday cake shown at 120. Alternatively, an originally created drawing or other graphic stored on an external memory device may be downloaded therefrom.

Certain embodiments of the present invention further include means on the user interface at the user station to form a text message, such as the greeting shown at 135. The text capability of the invention may include features known in the art such as type-face selection, font size selection and applying special effects to the text, such as warping.

As will be described further below, a user interface on the user-operated station may, in accordance with aspects of the present invention, allow a user to position the various graphical elements into a desired arrangement before printing the arrangement on the indicia carrier 105. Thus, a user has the freedom to create an original overall effect so as to convey the desired sentiment. It should be clear from FIG. 1A, that the recipient of the particular gift card 100 shown will be reminded not only of the birthday gift, but also of the grandchild giving the gift and the sentiment of the grandchild whenever the grandmother uses the gift card. Additionally, as will be discussed further below, features of the present invention allow the gift card to be refreshed, i.e., the funds available to the gift card may be renewed to the previous value or, even, a different value. In so doing, the grandmother may perpetuate the gift card's use, allowing herself to be continually reminded of the granddaughter long after the gift is given.

Whereas the example of FIG. 1A is illustrative of a birthday sentiment, it should be clear that countless other sentiments may be conveyed in accordance with the present invention. Moreover, it should be noted that the applicability of the present invention extends to advertising, rewards and other applications.

In accordance with certain other aspects of the present invention, the gift card 100 is a value-bearing instrument having the equivalent of cash at the market place of a merchant or set of merchants. As is well known, the bearer of the gift card need only present the instrument to a merchant in a transaction such as a purchase of goods or services. Thus, a prearranged business agreement exists between the vendor of the gift card and the intended merchant. Such agreements are well known and the specifics of such are not important to the present invention. However, the present invention includes provisions of notice for such agreements.

Indicia carrier 105 has disposed thereon an indication of a business agreement with a merchant or set of merchants. In certain embodiments of the present invention, such as that of FIG. 1A, the indication is in the form of a logo 130. The logo, trademark, or other indication of a prearranged business agreement, provides notice to an employee, such as a store clerk, that the agreement exists and that a valid transaction may occur contingent on the availability of funds associated with the gift card.

In certain embodiments of the present invention, the user-operated station has in a storage facility thereof a library of logos, trademarks and other indications of a prearranged business agreement when such agreement exists. As will be described further below, a user at the user-operated station chooses a set of merchants (including the closed set of a single merchant) for which the user intends the gift card to be used. The user-operated station then disposes the logo 130 on the indicia carrier 105. If the prearranged business agreement requires logo 130 to be in a specific location on the gift card, embodiments of the present invention ensure abidance thereto. Alternatively, certain merchants may provide their own preformatted cards, which the user may further personalize by one or more features of the present invention.

In certain cases, the prearranged business agreement may be with a financial institution such as a bank. The set of merchants for which a transaction is valid by a value-bearing instrument is then determined by the financial institution. For example, certain bank-issued credit and debit cards are accepted by a set of merchants participating in a credit network such as Visa® and MasterCard®. In addition to credit and debit cards, many financial institutions offer gift cards which are accepted by merchants participating in the credit network. Certain embodiments of the present invention include provisions for personalizing and dispensing various bank-issued cards.

To accommodate the requirements of a financial institution, indicia carrier 105 may include other features. For example, the logo 130 may be the trademark logo of the credit network, e.g., Visa® or MasterCard®. Moreover, indicia carrier 105 may include a card number 125 for tracking by the financial institution issuing the gift card the transactions executed therewith. Embodiments of the present invention may include arrangements for acquiring a card number from the financial institution and then disposing that number on the indicia carrier 105. Alternatively, the vendor of the gift cards may acquire a supply of pre-numbered gift cards upon which the personalized graphic arrangement may be further disposed.

FIG. 1B is an illustration of an exemplary obverse arrangement of gift card 100. As is shown in the Figure, gift card 100 includes one or more data stores 145, 155 inseparably coupled to the indicia carrier 105. The data store, which may be in the form of a magnetic strip 155 or an integrated circuit 145, provides means by which the value-bearing instrument maintains an indication of funds available for participation in a particular transaction. As is known in the art, the funds available for a transaction, at any given time, may be actually tracked at a remote facility, such as a bank. In such cases the data store 145, 155 has stored thereon the necessary information for accessing and tracking the funds available to the bearer of the card. In other embodiments, the funds available, at any given time, are tracked and stored on data store 145, 155. Thus, as will be discussed further below, the system of the present invention includes means for accessing and altering the information stored on data store 145, 155.

Dispensing of value-bearing instruments in accordance with certain embodiments of the present invention may be of a particular type of card physically pre-stored at a given kiosk, for instance. It may also be of a card or other value-bearing instrument supplied by the user him-/herself prior to the authoring of personalizing indicia thereon as disclosed herein.

As is shown in FIG. 1B, the obverse of indicia carrier 105 may include other informative elements 150 such as terms and conditions of use and restrictions imposed by the vender. Additionally, the obverse of indicia carrier 105 may include other graphical elements such as the logo shown at 140. The graphical elements on the obverse of indicia carrier 105 may include items required by terms of the prearranged business agreement as well as user-provided elements, when such are not precluded by any prearranged business agreement.

Gift cards and other value-bearing instruments may include features directed to security or for verifying the identity of the bearer. The present invention may include provisions for such features, however the implementation thereof is not important to the invention. As such, provisions for added security features will not be discussed further herein, although it should be clear that extensions to the system and method to implement such features may be applied without deviating from the intended scope of practice of the invention.

Referring now to FIG. 2, there is shown a block diagram of an exemplary embodiment of the user-operated station of the present invention. The user-operated station 200 is, in certain embodiments of the present invention, a self-contained unit such as a kiosk. However, it should be noted that various elements of the system may be in a location different from other elements of the system. For example, elements of a user interface may be at one location and elements involved with the actual dispensing of the gift card may be in a separate location. In the following description, the use of the term "kiosk" is intended to indicate the user-operated system 200, although the physical implementation of such system may necessitate some distribution of elements, depending on the particular requirements of the intended application.

In certain embodiments of the present invention, a user may author a personalized gift card at kiosk 200 via user interface consisting of a display, such as display 230, and one or more input devices, such as keyboard 240. As will be discussed in paragraphs that follow, a graphical representation of the gift card is presented to the user on display 230 by instrument template 233. The user then retrieves a number of graphic elements from a plurality of graphic sources and positions them on a desired location of template 233. The arrangement may be conducted by known means, e.g., dragging with an input device or by touch screen manipulation. The user interface may also include a tool bar 235 on display 230, which presents to the user a plurality of different software tools for the authoring of the graphical arrangement on template 233.

Occasionally, a user may not wish to spend the time required to author the graphic arrangement at the user station 200. To accommodate those users, certain embodiments of the present invention acquire the graphical arrangement data from an authoring form, such as that illustrated in FIG. 4. A user may enter the gift card authoring data on the form, as will be discussed below, in a location remote from kiosk 200. Later, when the user is ready to purchase the gift card, the user supplies the form to form reader 298 located at the kiosk. Form reader 298 may be any suitable device for retrieving the user-entered data from the form, such as an optical scanner. Additionally, the form reader 298 may be associated with software for recognizing and processing human handwriting, such as optical character recognition (OCR) software known in the art. The present invention, when so enabled, applies the graphical arrangement to the gift card from the authoring form as if the data were entered at the user interface.

In certain embodiments of the present invention, the user interface of kiosk 200 may include a printer 245 for providing to the user documentation relating to a transaction, such as a hard copy receipt thereof. The printer may also be used to print an access code for recalling at a later time a value-bearing instrument ordered by submission of an authoring form when the authoring tools of the user interface are being used by another kiosk patron, as will be discussed further below.

User-operated station 200 may include several sources for retrieving graphic elements therefrom. These sources may include a digital camera 270 installed on the kiosk 200 for operation by a user. In other embodiments, a graphical source may be a scanner 275, such as is known in the art, installed on kiosk 200 for digitizing images from hard copy such as a photograph. Another exemplary graphic source may be a disk reader 280 for retrieving graphics or other elements from a disk type memory, e.g., CD ROM or DVD.

User-operated station 200 may include, in certain embodiments, a plurality of external graphic device ports 265a-265c so as to allow the user to recover a graphic element from an external graphic device. Such graphic devices may include a portable digital camera, a portable disk player, or an external memory device such as a memory stick. One or more of the external graphic device ports 265a-265c may be compliant with an industry standard such as the Universal Serial Bus (USB) or the Personal Computer Memory Card International Association (PCMCIA) interface.

Certain embodiments of the present invention include a drawing interface 285 for allowing the user to compose a graphical element at the kiosk 200. The drawing interface may include an input device such as a digitizer tablet, a mouse, a digital stylus, etc., operating in a drawing software environment such as those known in the computer graphics art. In another embodiment of the invention, the drawing interface may be incorporated into display 230 as a touch screen operating in conjunction with the drawing software. The user may operate the drawing interface to compose a graphical element onto the gift card template 233. Tool bar 235 may include tools to assist the user in drawing certain objects, such as shapes.

The exemplary graphic tools described above may be used individually, or in combination with one another, to allow a user to create an original graphic arrangement to be disposed on the gift card. For example, the user may wish to first place a photographic image in the graphical arrangement and, to that end, selects the installed digital camera 270 via the user interface. The camera 270 may take a still photograph of the user when the user instructs the camera to do so, such as after a desired pose has been struck. The user may then be presented with options to, for example, place the present photograph on the instrument template, retake the photographic image, or to discard the image. Once the user has accepted a particular photograph, he may place it on the instrument template by, for example, a drag-and-drop operation on a touch-screen display. The user may then, say, draw a unique decorative border around the photograph using the drawing interface. Then, the user may select a clip art item from a user-provided CD through the installed disk reader. The clip art may be placed in a desired location by another drag-and-drop operation. Further graphic elements are similarly created and/or added, each through an associated graphic tool, such as those described above. It should be obvious to the skilled artisan that the features of the present invention afford great creative freedom in authoring the graphic arrangement of the gift card. The number and type of graphic arrangements that may be authored are limited only by the creativity of the user.

As is shown in the Figure, user-operated station 200 may include an instrument carousel 210 for selecting a value-bearing instrument from one of a plurality of instrument stores 205a-205d. Each of the instrument stores 205a-205d includes a supply of non-personalized gift cards. For example, one instrument store, say 205a, includes gift cards that are completely blank, and another one of the stores, say 205b, includes a supply of gift cards that are pre-numbered in accordance with the numbering system of a particular financial institution. Thus, the user may select a set of merchants and the appropriate blank gift card may be selected from the corresponding instrument store 205a-205d via the instrument carousel 210.

The present invention may, in certain embodiments, provide means by which a user may dispose a graphical arrangement on value-bearing instrument that is already in the user's possession, as opposed to a "fresh" value-bearing instrument held in the instrument stores 205a-205d. A user would provide the instrument, such as a gift card, credit card, debit card, etc., to instrument receiver 225, which would convey the instrument to instrument printer 215. The system of the present invention would then dispose upon a surface of the instrument, provided such disposition is not prohibited, the authored graphical arrangement in similar fashion to the disposition of a graphical arrangement on a blank instrument, which is explained below.

When the appropriate value-bearing instrument has been selected by the instrument carousel 210, an indication of an amount of funds available will be written to the data store on the gift card via data store access module 213. The data store access module 213 may include a magnetic write head, for writing data onto a magnetic strip and may include a memory writer known in the art for writing to memory stored on an integrated circuit, such as is implemented for smart cards. Data store access modules of these types are well known in the art and further details will not be discussed herein.

When the user is satisfied with a graphic arrangement as shown on the user interface, the user may instruct user-operated station 200 to then print the graphic arrangement onto the previously selected value-bearing instrument. For that purpose, user-operated station 200 may include a graphic capable instrument printer 215. Such printers are known in the art and may include a lamination mechanism for providing a protective laminate over the printed graphics. The completed gift card is then dispensed to the user at the user-operated station via instrument dispenser 220.

To process user payment at the user-operated station 200, embodiments of the present invention include a funds receiving module 287. The funds receiving module 287 may include a card reader 290 for reading a credit or debit payment card and a cash receiver 295, for receiving and identifying cash in the form of currency and coin.

In the exemplary embodiment of FIG. 2, instrument receiver 225 is coupled to data store access module 213. This arrangement allows for funds associated with a previously authored gift card to be refreshed. A user simply accesses kiosk 200, provides funds to funds receiving module 287, and then inserts the previously authored gift card into instrument receiver 225. The data store access module 213 provides then an indication of the new funds onto the data store of the gift card once payment by the user has been received.

As is shown in the Figure, the various system components of user-operated station 200 are coupled to central processing unit 250, which provides the computing mechanism for controlling the overall operation of the system. As is known in the art, central processing unit 250 may include an operating system having executing thereon graphic software, communications software, machine control software, financial software, etc. The fundamental processes of user-operated station 200 are discussed in paragraphs that follow.

In certain embodiments of the present invention, user-operated station 200 may include a storage facility 252 for storing software and providing scratch pad memory for various operations. Additionally, storage facility 252 may include a graphic element library and a library of merchant logos, trademarks, and other indications of prearranged business agreements.

User-operated station 200 may include a telecommunications adapter 255 for communicating data over a telecommunications network. The data may include, but is not limited to, that of authorizing the transferal of funds from a credit card, order information and graphic arrangement data of a remotely ordered gift card (to be discussed in paragraphs that follow), maintenance information required by an owner/operator of the user-operated station 200, and financial information for a financial network. Telecommunications adapter 255 may be a modem or other telecommunications network interface adapter known in the art.

The exemplary system of FIG. 2 is operable to personalize with great originality a value-bearing instrument in accordance with aspects of the present invention. An owner or other operator of kiosk 200 (as opposed to the user or patron of kiosk 200) may receive a fee for affording the user access thereto. The fee may be collected from the user at the time of use of the kiosk as an addition to the funds provided as the gift. Alternatively, the fee may be collected from a third party, such as a merchant or an advertiser.

Referring to FIG. 3A, there is shown a flow chart of the fundamental method steps of personalizing a value-bearing instrument in accordance with the present invention. As will be made clear, many of the method steps may be performed by a user at a location remote from the kiosk 200. For example, in certain embodiments, a user can submit a graphical arrangement by an authoring form over a telecommunications network such as the Internet, as is described further below.

Upon initiating a user session at block 310, the user pays for any fees and for the amount of the gift at block 320. Block 320 is further detailed in FIG. 3B and is discussed below. Once payment has been provided, flow is transferred to block 330, which is further detailed in FIG. 3C, whereby a set of merchants is selected. An indication of the amount of the gift is stored on the data store of the value-bearing instrument, as indicated at block 340.

Once payment has been received and properly stored on the instrument, the user is then presented with the means at the user interface to author the graphic arrangement to be disposed on the instrument, as shown at block 350. Block 350 is further detailed in FIG. 3D and is discussed further below. When the user is satisfied with the graphic arrangement, the user instructs the system to print the graphic arrangement on the value-bearing instrument, as shown at block 360. The instrument is then dispensed to the user, as shown at block 370, and the procedure is exited at block 380.

Figure 3B:
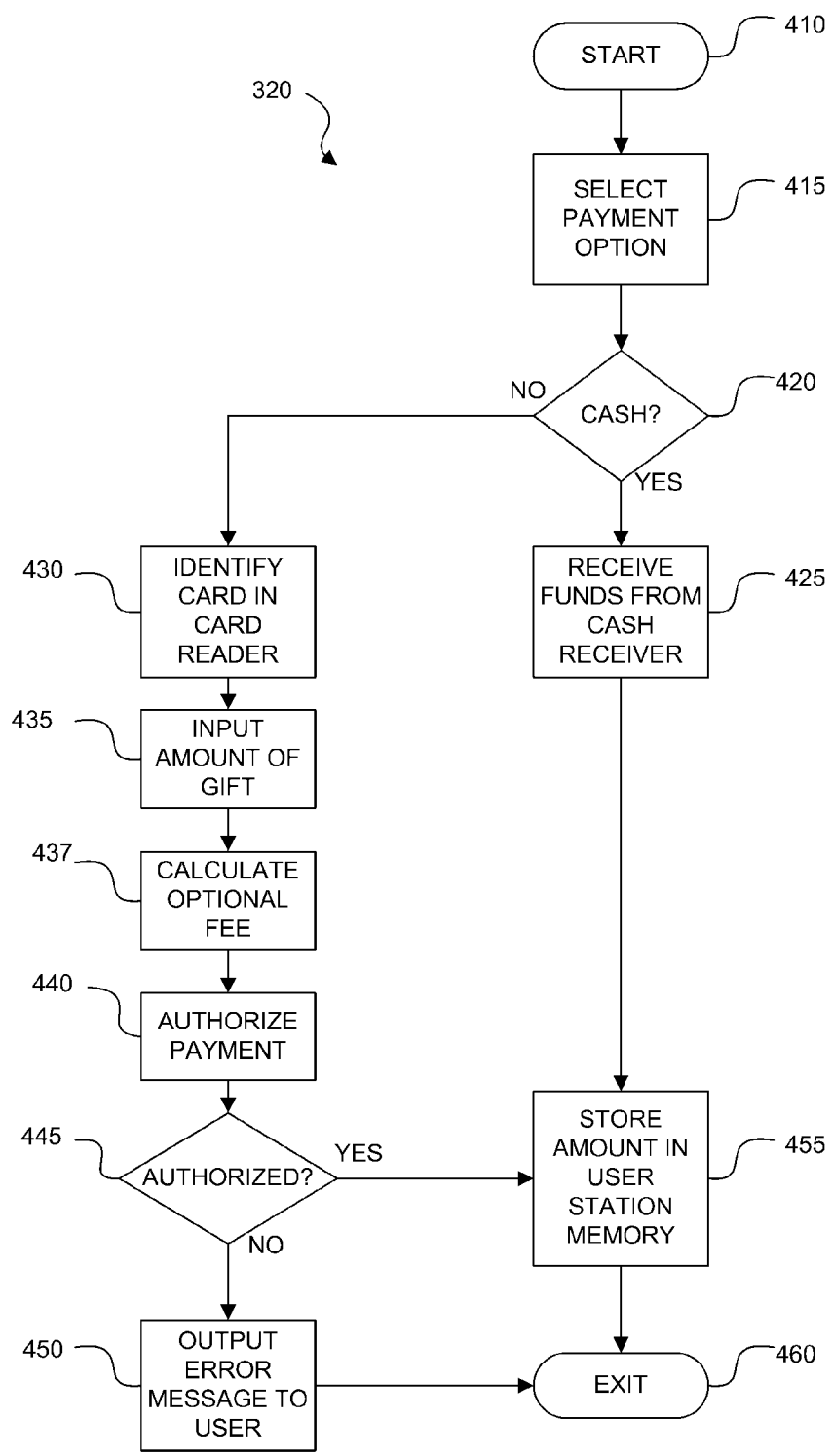
FIG. 3B is a flow chart illustrating, in more detail, the payment providing step of the method of the present invention.

The payment providing step 320 is illustrated in greater detail by flow chart of FIG. 3B. As is shown in the Figure, the procedure starts at block 410 and flow is transferred to block 415, where the user is presented payment options. It is then determined if the user wishes to pay with cash as indicated at block 420. If the user wishes to pay with cash, funds are received from the user via the cash receiver 295, as shown at block 425. If the user opts to pay by means other than cash, the card reader 290 is consulted to identify the credit or debit card therein, as shown at block 430. The user is then prompted to input an amount of the gift at block 435 and an optional fee is added to that amount as shown at block 437. The total amount is then authorized with the financial institution via a telecommunications network by known methods, as shown at block 440. It is then determined, at block 445, if the amount of purchase is authorized. If no authorization was received, an error message to that effect is output to the user as shown at block 450. If the amount is authorized, the amount is stored in user station memory as shown at block 455. The amount is also stored as a result of receiving the funds from the cash receiver. The amount is held in user station memory for subsequent storage of an indication thereof onto the data store of the value-bearing instrument.

Figure 3C:
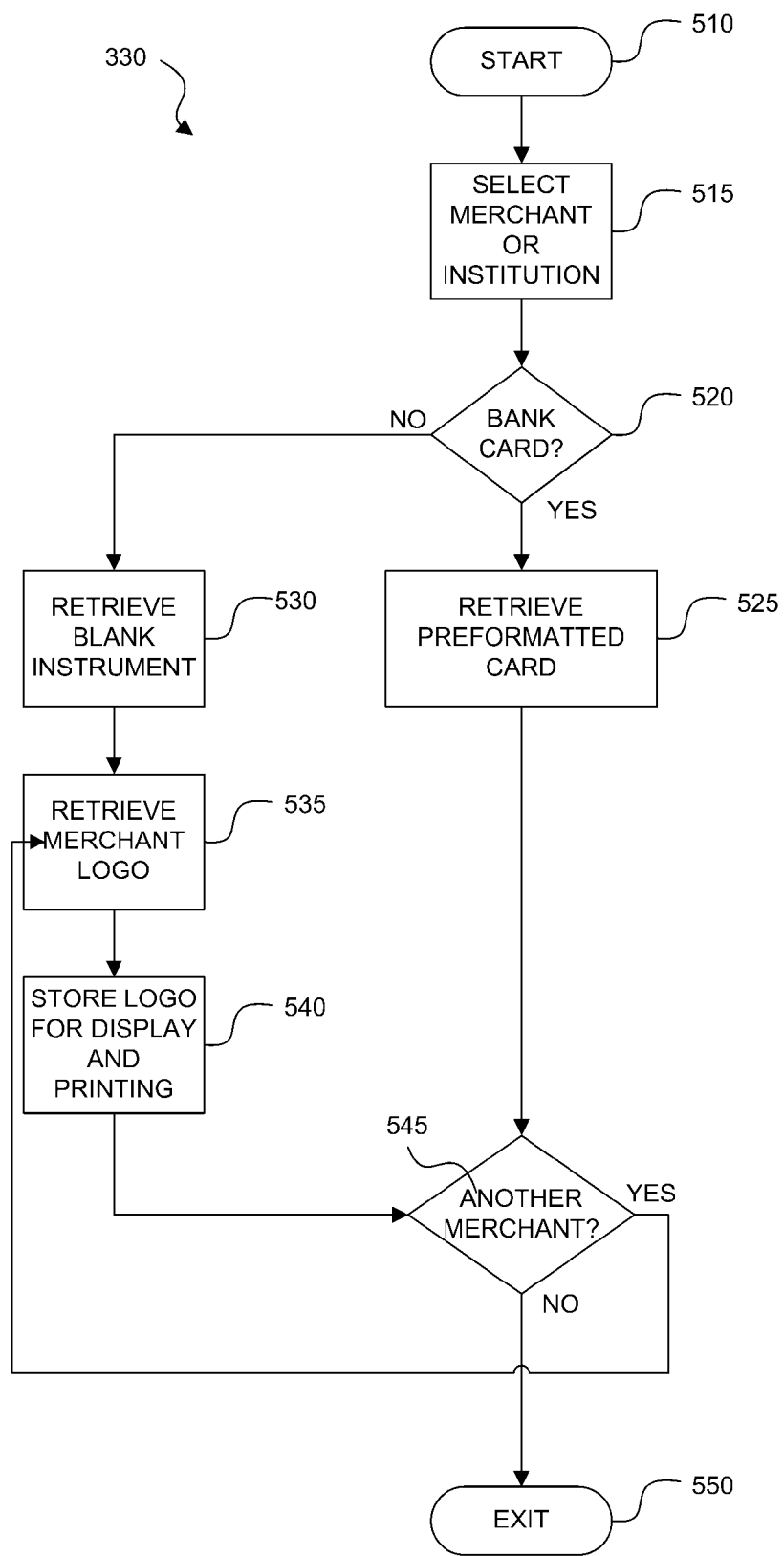
FIG. 3C is a flow chart illustrating, in greater detail, the steps for selecting a set of merchants in accordance with the present invention.

FIG. 3C depicts via a flow chart of the fundamental method steps for an exemplary method of selecting a set of merchants in accordance with the present invention. The steps correspond to block 330 of FIG. 3A and the procedure is entered at block 510. The user is presented with a list of available merchants and/or financial institutions at block 515. It is then determined if a bank issued instrument in the form of a bank issued card is required, as shown at block 520. If the value-bearing instrument requires a previously formatted card, one is retrieved as shown at block 525. If no such bank card is required, a blank instrument is retrieved via the instrument carousel 210. The logo or trademark of the selected merchant is then retrieved from, for example, the previously described database of merchant logos, as shown at block 535. Flow is then transferred to block 540 where the logo is stored for purposes of display and printing in later method steps. It is then determined at block 545 if another merchant is desired. This exemplary procedure allows a value-bearing instrument to be valid at more than one independent merchant. If another valid merchant is to be added, the user selects such from the previously displayed menu, and the logo is retrieved at block 535. If the user is done with selecting the set of merchants, the user is exited at block 550.

Figure 3D:
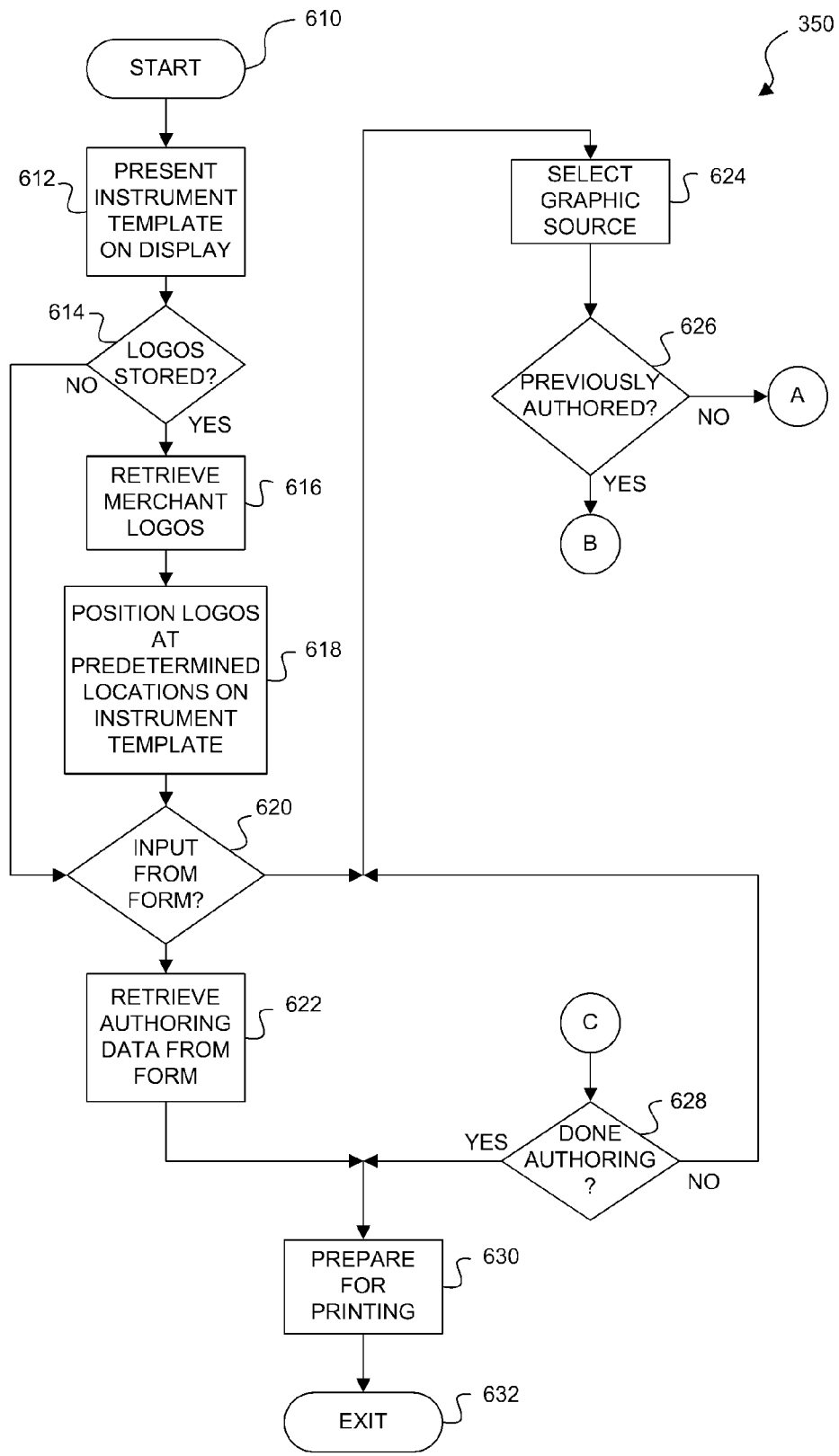

Referring to FIG. 3D, there is shown a flow chart of the fundamental method steps of an exemplary embodiment of the graphic arrangement authoring step 350. The procedure is entered at block 610 and flow is transferred to block 612, whereby a graphical representation of the value-bearing instrument, in the form of an instrument template, is displayed to the user. The procedure then determines at block 614 if merchant logos were previously stored. If not, flow is transferred to block 620, which will be discussed below. If merchant logos have been stored by a previous method step, those logos are retrieved at block 616 and are positioned at predetermined locations on the instrument template at block 618. Flow is then transferred to decision block 620, where it is determined if the authoring data is on an authoring form, as will be described in further detail below. If so, the process continues at block 622, where the data are retrieved from the authoring form via the form reader 298. If the data are to be entered via the graphic tools of the kiosk 200, flow is transferred to block 624, whereby a graphic source is selected.

If it is determined at block 626 that the graphic element associated with the graphic source is a previously authored graphic, the graphic is retrieved according to its corresponding source location, as illustrated in FIG. 3E. If the graphic is located on onboard memory, as indicated at block 722, the graphic is retrieved therefrom at block 724. If it is determined that the pre-authored graphic is on a disk, as shown at block 726, the graphic is received therefrom at block 728. If the graphic is on an external device, as determined at block 730, the graphic is received from the external device coupled to one of the communication ports 265a-265c, as shown at block 732. If the previously authored graphic is a hard copy, such as a photograph, as determined at block 734, the graphic is retrieved from scanner 275, as shown at block 736.

If at block 626 of FIG. 3D it was determined that the graphic was not a previously authored graphical element, an active graphic device is selected at block 710 of FIG. 3E. If the active graphic device is a camera, as determined at block 712, a photographic image is captured thereby at block 714. If the drawing pad is selected as the active graphic device, as determined at block 716, the drawing interface is used to capture a drawing image at block 718.

Once a graphical element has been retrieved either through a previously authored graphic or an active graphic device, the graphic element is then positioned by the user on the instrument template as shown at block 720. If the user is done authoring the graphic arrangement on the instrument template, the graphical arrangement is prepared for printing onto the value-bearing instrument at block 630 of FIG. 3D and the process is exited at block 632. If, however, the user wishes to add another graphical element, flow is transferred to block 624 whereby the graphic is retrieved from the appropriate graphic source.

Certain embodiments of the present invention include provisions for the use of authoring forms for authoring a graphical arrangement, which can be subsequently disposed on an indicia carrier of the instrument. The implementation of authoring forms allows, among other benefits, a user to author a graphical arrangement while the graphical tools of the user interface are being used by another kiosk patron. For example, the system may be outfitted to allow a user to insert an authoring form into the form reader 298 while another user is occupying the user interface. The system may issue the user of the form an order recall code via, for example, printer 245 or a separate printer installed at the kiosk specifically for printing order recall codes upon the insertion of an authoring form. Later, the user may enter the recall code at the user interface of the kiosk and provide payment for the value-bearing instrument to receive the instrument from instrument dispenser 220.

Figure 4:
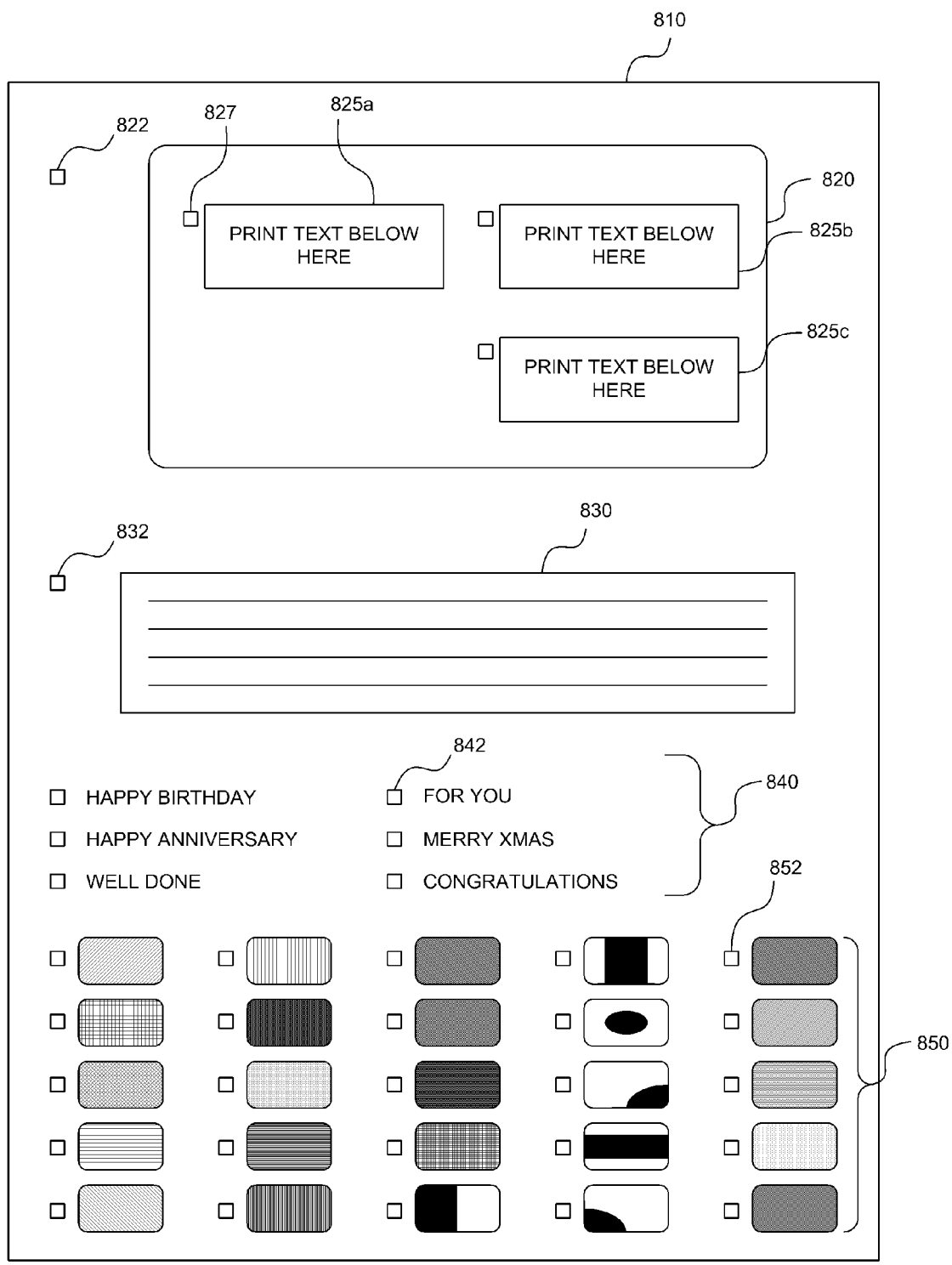
FIG. 4 is an illustration of an exemplary gift card authoring form utilized in certain embodiments of the present invention; and, FIG. 5 is a flow chart illustrating an exemplary use of forms to accommodate multiple users on the system of the present invention.

An exemplary authoring form 810 is illustrated in FIG. 4. It should be noted that while previously described embodiments of the invention were presented in such a way as to imply form 810 being of a hard copy document, such as on paper, the authoring form may also be of an electronic type, such as a computer image of a scanned authoring form or an interactive electronic form at a web site of a kiosk operator. When so implemented, as should be clear to the skilled artisan, the form need not be introduced to the system of the present invention via the form reader 298, but may be introduced by electronic means such as over a telecommunications network, such as the internet, via an appropriate communications protocol, such as the Simple Mail Transfer Protocol (SMTP), the File Transfer Protocol (FTP) or the Hyper Text Transfer Protocol (HTTP). Alternatively, the user may scan a completed hard copy authoring form into a memory device which can subsequently be transported to a kiosk. Thus, a user may author the graphical arrangement at a remote location and visit a kiosk, such as one kiosk in a network of kiosks under the control of an operator, and retrieve the finished value-bearing instrument when the user's time permits.

As is shown in FIG. 4, authoring form 810 includes an instrument template 820 on which the user may author a graphical arrangement using graphical tools at the user's disposal. For example, the user may provide a simple hand drawing on instrument template 820 of a hard copy authoring form while standing in line at a kiosk. In another example, the user may provide a number of graphical elements through various graphical tools available on a kiosk operator's website. The use of an authoring form does not limit the number of type of graphical elements which may be distributed on the instrument template 820. The use of forms is provided as a convenient alternative to using the user interface of the kiosk, among other benefits.

In certain embodiments of the present invention, authoring form 810 may include a text entry block 830 for entering text to be subsequently disposed on the indicia carrier of the value-bearing instrument. Instrument template 820 may contain one or more text positioning blocks 825a-825c for allowing the user to select a position that which the text entered in block 830 is to be printed on the instrument. The text positioning blocks 825a-825c may be printed on instrument template 820 in such a manner, such as being of a particular color, so as to be ignored by scanning operations of the form reader 298. The user may select an appropriate position for the text entered in text entry block 830 by appropriately marking one or more of the selection blocks 827. The system of the invention will enter the text at the selected location. In certain embodiments, the system of the present invention may apply optical character recognition techniques to the text entered in block 830 and allowing the user to subsequently select a type fact and font size for the text. When the user wishes to utilize the text entry features of form 810, he may mark the block 832 to indicate such.

As an alternative to, or in addition to the text entered in block 830, preformatted messages 840 may be provided on authoring form 810. The user may select any of the preformatted messages by marking the corresponding selection box 842.

Authoring form 810 may further include a plurality of preformatted graphic arrangements or background patterns as indicated at 850. The preformatted graphic arrangements may include, but are not limited to, works of art, popular photographs, graphics relating to a holiday theme, or simple background colors and patterns. The user may select a preformatted graphical arrangement by making an indication in a selection box 852. The selected preformatted graphical arrangement will be disposed, in certain embodiments, as a background, for example, for other user-entered graphical elements.

Figure 5:
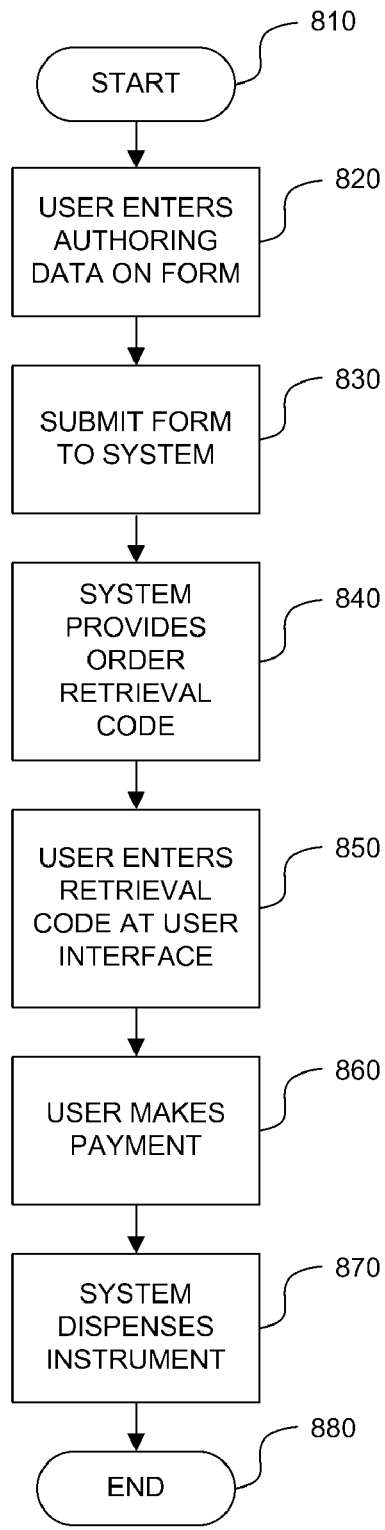

FIG. 5 illustrates via a flow diagram exemplary method steps for utilizing authoring forms in embodiments of the present invention. As previously stated, authoring forms may be submitted to the system while another user simultaneously occupies the user interface of kiosk 200. Additionally, as previously described, the authoring form may be a hard copy form, such as on paper and read by form reader 298, or may be in electronic form, such as a scanned image of a completed authoring form or an interactive form on a website, and submitted to the system of the present invention via a telecommunications network, such as by e-mail or other normal Internet traffic.

As shown in FIG. 5, the authoring form procedure is entered at start block 810 whereupon flow is transferred to block 820, whereby the user enters the authoring data on form 810. Flow is then transferred to block 830, whereby the authoring form is submitted to the system by, for example, inserting the form into form reader 298. The system then provides an order retrieval code, as shown at block 840, via, for example, printer 245.

When the user is ready to pick up the value-bearing instrument at the kiosk 200, the user enters his retrieval code at the user interface thereof, as shown at block 850. Flow is then transferred to block 860, whereby the user makes the appropriate payment to provide funds to the value-bearing instrument as previously described. When the transaction has been completed, the system dispenses the value-bearing instrument to the user, as shown at block 870, and the process is exited at block 880.

Although the invention has been described herein in conjunction with specific embodiments thereof, many alternatives, modifications and variations will be apparent to those skilled in the art. The present invention is intended to embrace all such alternatives, modifications and variations that fall within the spirit and broad scope of the appended claims.

What is claimed is:

1. A method for dispensing personalized value-bearing instruments, the method comprising the steps of:
   a. providing a user-operated station for dispensing the value-bearing instruments;
   b. selectively providing a plurality of user-selectable instrument stores, a first instrument store including a plurality of blank instruments and at least a second instrument store including a plurality of merchant-specific instruments;
   c. receiving funds from a user at said user-operated station;
   d. storing an indication of said funds on a data store inseparably coupled to said value-bearing instrument selected from one of said instrument stores;
   e. providing a user interface at said user-operated station for personalizing an indicia carrier inseparably coupled to said value-bearing instrument;
   f. providing on said user interface a plurality of user-selectable graphic authoring procedures;
   g. executing at least one of said user-selectable graphic authoring procedures to formulate an original graphic arrangement;
   h. printing said graphic arrangement on said indicia carrier; and,
   j. dispensing said value-bearing instrument to said user subsequent to said graphic arrangement being printed on said indicia carrier.

2. The method as recited in claim 1 further including the steps of:
   providing on said user interface a menu for selectively defining said set of merchants for which said funds are to be used; and,
   printing an indication of said set of merchants on said indicia carrier in accordance with a selection thereof by said user.

3. The method as recited in claim 2, whereby said set of merchants is selected by selecting a financial institution transacting with said set of merchants on behalf of said user.

4. The method as recited in claim 2, whereby said set of merchants is a closed set consisting of one merchant.

5. The method as recited in claim 2, wherein said access affording step (e) includes the step of receiving payment of a fee from at least one of said user, said set of merchants, and an operator of said user-operated station.

6. A method for personalizing a value-bearing instrument at a user-operated station, the method comprising the steps of:
   a. selectively providing a plurality of user-selectable instrument stores, a first instrument store including a plurality of blank instruments and at least a second instrument store including a plurality of merchant-specific instruments;
   b. providing the value-bearing instrument selected from one of said instrument stores with;
      an indicia carrier; and,
      a data store inseparable from said indicia carrier;
   c. providing the user-operated station with:
      a user interface;
      a funds receiving module;
      a plurality of graphic generating modules;
      an indicia printer; and,
      a data access module for accessing and altering data on said data store;
   d. receiving via said funds receiving module funds from a user at the user-operated station;
   e. storing via said data access module an indication of said funds on said data store;
   f. presenting on said user interface a graphical representation of said indicia carrier;
   g. generating an original graphic from said plurality of graphic generating modules;
   h. laying out said graphic on said graphical representation of said indicia carrier responsive to user input via said user interface;
   i. repeating steps (g) and (h) until a desired graphic arrangement on said graphical representation of said indicia carrier is achieved;
   j. printing with said indicia printer said graphic arrangement on said indicia carrier; and,
   k. dispensing the value-bearing instrument to said user.

7. The method as recited in claim 6 further including the steps of:
   selecting a set of merchants for which said funds are to be used; and,
   printing an indication of said set of merchants on said indicia carrier.

8. The method as recited in claim 6 further including the steps of:
   providing said user station with a graphic drawing interface;
   generating a graphic on said graphical representation of said indicia carrier via said drawing interface; and,
   continuing the method at step (h).

9. The method as recited in claim 6, whereby said graphic retrieving module step includes the step of providing at least one graphic retrieving module from the group consisting of a camera, a scanner, and a memory module.

10. The method as recited in claim 9, whereby said memory module is one of the group consisting of a compact disk, a digital virtual disk, and a memory stick.

11. The method as recited in claim 6 further including the steps of:
   providing the user-operated station with a form reader; and,
   retrieving via said form reader a graphic arrangement from hard printed authoring form for manual completion and submission thereto by said user.

12. The method as recited in claim 11, whereby said form reader providing step includes the step of providing said form reader with an optical scanner for retrieving said graphic arrangement from said authoring form.

13. The method as recited in claim 11, further including the step of transmitting said authoring form to said form reader from a location remote from the user-operated station.

14. The method as recited in claim 11, further including the steps of:
   assigning an order recall code to said graphic arrangement on said authoring form; and,
   disposing on said indicia carrier said graphic arrangement on said authoring form when said user enters said order recall code on said user interface at the user-operated station.

15. The method as recited in claim 6, further including the steps of:
   providing an interactive authoring form at a remote location;
   retrieving a graphic arrangement as input by said user via said interactive authoring form;
   assigning an order recall code to said graphic arrangement as input by said user via said interactive authoring form; and,
   disposing on said indicia carrier said graphic arrangement as input by said user via said interactive authoring form when said user enters said order recall code on said user interface at the user-operated station.

16. A system for personalizing a value-bearing instrument at a user-operated station, the system comprising:
   a plurality of user-selectable instrument stores, a first instrument store including a plurality of blank instruments and at least a second instrument store including a plurality of merchant-specific instruments;
   on the value-bearing instrument selected from one of said instrument stores;
      an indicia carrier; and,
      a data store, wherein said indicia carrier and said data store are both inseparable from the value-bearing instrument;
   on the user-operated station;
      a user interface operable to author a graphic arrangement on an indication of said indicia carrier presented to the user thereon;
      a funds receiving module operable to receive funds from a user;
      a plurality of user-selectable graphic generating modules, each operable to retrieve a graphic from a graphic source and to subsequently add said graphic to said graphic arrangement;
      an indicia printer operable to print said graphic arrangement on said indicia carrier; and,
      a data access module operable to access and alter data on said data store.

17. The system as recited in claim 16, wherein said user-operated station includes a graphic drawing interface operable to generate a graphic on said graphical representation of said indicia carrier responsive to user drawing operations.

18. The system as recited in claim 16, wherein said graphic generating module includes at least one graphic generating module from the group consisting of a camera, a scanner, and a memory module.

19. The system as recited in claim 18, wherein said memory module is at least one taken from the group consisting of a compact disk, a digital virtual disk, and a flash memory stick.

20. The system as recited in claim 16, further including a form reader for retrieving a graphic arrangement from an hard printed authoring form manually completed and submitted thereto.

* * * * *